United States Patent [19]

Frame et al.

[11] 4,253,049

[45] Feb. 24, 1981

[54] CRT DISPLAY UTILIZING STANDARDIZED MODULES AND A REMOTE MODULE RELATING TO CRT STRUCTURE

[75] Inventors: Wayne W. Frame, Longmont; Daniel G. Douglas, Boulder, both of Colo.

[73] Assignee: Ball Corporation, Muncie, Ind.

[21] Appl. No.: 860,313

[22] Filed: Dec. 12, 1977

[51] Int. Cl.³ .................... H01J 29/70; H01J 29/76; H04N 5/64
[52] U.S. Cl. .................................. 315/399; 315/389; 315/405; 358/254
[58] Field of Search ............ 358/40, 11, 64, 139, 358/140, 240, 254; 315/370, 371, 389, 405, 368, 364, 399

[56] References Cited

U.S. PATENT DOCUMENTS

| | | | |
|---|---|---|---|
| 3,539,720 | 11/1970 | Marshall | 358/10 |
| 3,637,932 | 1/1972 | Wigley | 358/254 |
| 3,708,618 | 1/1973 | Hofmeister et al. | 358/254 |
| 4,093,960 | 6/1978 | Estes | 358/10 |

*Primary Examiner*—Terrell W. Fears
*Assistant Examiner*—Aristotelis M. Psitos
*Attorney, Agent, or Firm*—Gilbert E. Alberding

[57] ABSTRACT

A program card comprised of passive elements is collocated or otherwise considered part of the cathode ray tube, CRT, module of a modularized display unit, and is used to dictate major system operating parameters to a set of cooperating electronic modules. This concept allows an appropriate standard set of electronic modules to drive CRTs of differing deflection angles, screen and neck sizes. Sparing cost and logistic complexity can be reduced at field installations which utilize CRT displays of various sizes.

23 Claims, 16 Drawing Figures

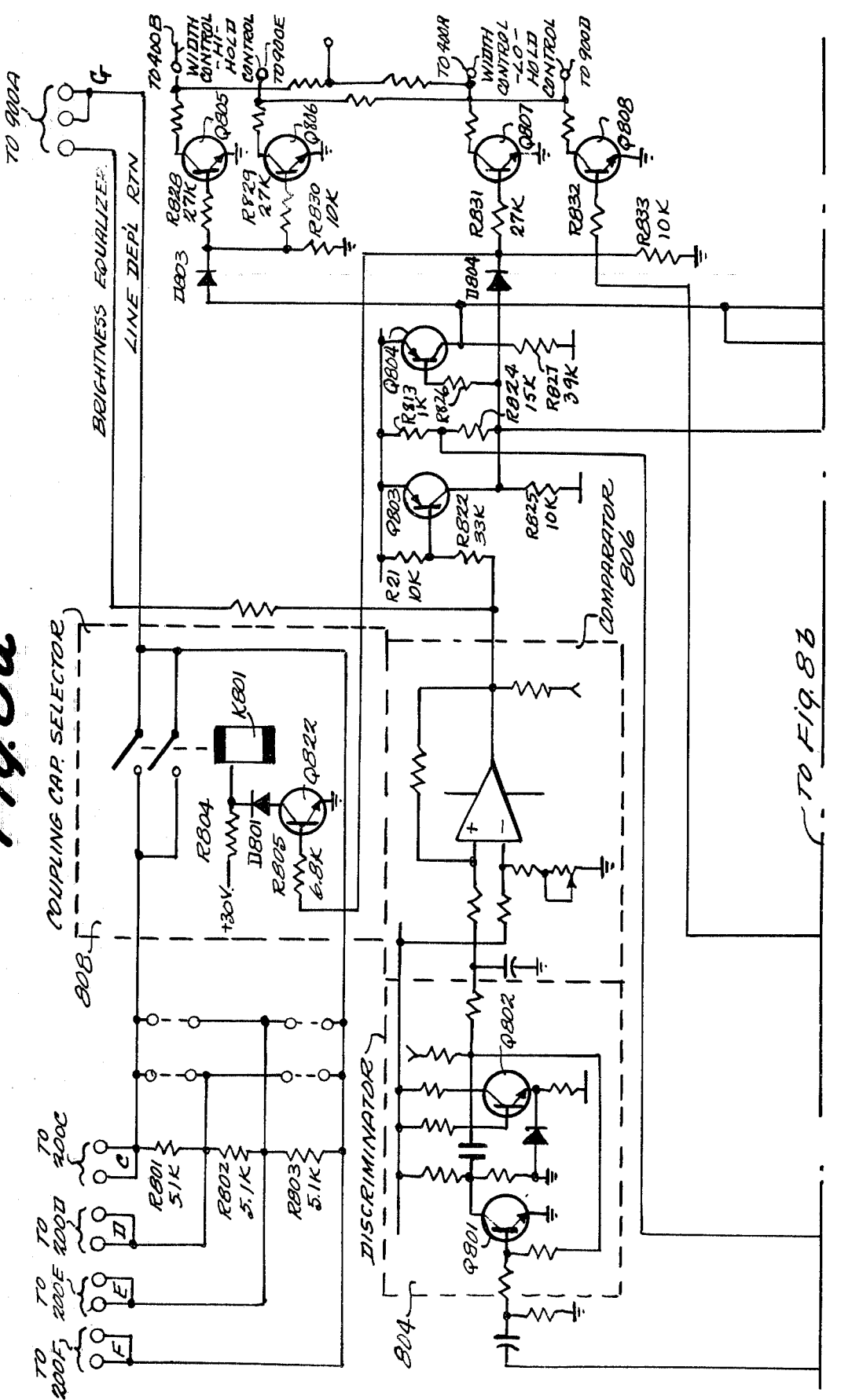

CRT DISPLAY UTILIZING STANDARDIZED MODULES AND A REMOTE MODULE RELATING TO CRT STRUCTURE

BACKGROUND OF THE INVENTION

The present invention relates to cathode ray tube displays.

Cathode ray tubes (CRT) produce a two dimensional visual display by raster scanning an electron beam over a phosphorescent surface (screen). The phosphor emits light of varying intensity in accordance with the number of electrons striking the screen. The electron beam is scanned across successive horizontal lines to illuminate the entire screen on a point-by-point basis, and trace a two dimensional picture on the face of the tube. While the electron beam illuminates only one spot at a given instant, the scanning is effected at a rate beyond the maximum rate to which the human eye can respond. Thus, the entire screen appears to the human observer as being fluorescent, and the overall picture is perceived by the observer.

More specifically, a composite video signal, including video and synchronizing information in accordance with standards set out in, for example, Electronic Industries Association (EIA) standards RS-170 and RS-343, is amplified, and applied to the electron gun of the CRT. Potentials are applied to the CRT anodes (A1 and A2) to control the energy (acceleration) in the beam, and hence the brightness of the displayed image. Focusing of the beam is accomplished by applying voltages to grids G1 and G2. In high resolution displays provisions are usually made to modulate the focus potential with a parabolic waveform of suitable amplitude and phase so that sharp beam focus is maintained over the entire screen.

The scanning is effected by deflecting the electron beam with an electrostatic or magnetic field. Signals with generally sawtooth waveforms are applied to either respective vertical and horizontal plates, or respective sets of deflection coils, disposed so that electron beam passes through the electrostatic or magnetic fields generated thereby. Deflection coils are generally disposed in a yoke set around the neck of the CRT, and include two pairs of coils, each mounted at right angles to the other. The two coils of each pair are generally connected in series and mounted on opposite sides of the neck of the tube.

It should be appreciated, that the particular deflection signals required to provide a full raster scan of the CRT, is a function of the structure and geometry of a particular CRT and the $A_2$ acceleration potential. The maximum amount of deflection required is proportional to; the sine of the half angle, to the square root of the anode voltage, and roughly to the neck diameter squared. While the deflection waveforms are basically sawtooth type waveforms, it has been found that when the electron beam deflection center and tube face center of curvature have different radii, the displayed image is distorted. Thus, a correction factor ("S correction") to compensate for the difference in the relative centers of curvature is generally utilized. In addition, the anode and grid biasing voltages vary from CRT to CRT.

It would be desirable if standardized electronic assemblies were available that could be interchanged between units utilizing various size CRTs. Thus, manufacturing procedures could be simplified, and the number of different spare parts required in stock would be minimized. More importantly, Command Control Communication, C3, installations such as NORAD, SAC, etc., which use CRT's of various sizes, could more easily logistically support high priority displays with a minimum of spare electronic modules. However, as noted above, CRT's of different screen size and, for example, their attendant deflection coils require varying circuit parameters. Installations that so utilize displays typically operate at more than one of the scan rates delineated in RS-170 and RS-343. Automatic line rate ranging systems are known in the art, operable to lock in on any received line rate within a wide range of frequencies (generally the range of line rates prescribed by RS-343). Such systems, however, are relatively complex and expensive. Further, the sophistication of the system tends to reduce reliability.

SUMMARY OF THE INVENTION

The present invention is directed to a modular CRT display utilizing standardized modules operable with CRT's of varying sizes, and a separate program card including components determinative of the required circuit parameters for the particular CRT. The separable (remote) program card utilizes only passive components such as resistors, capacitors and jumper connectors, and includes no active elements so that the reliability of the CRT module will not be substantially degraded. The program card establishes all major CRT-yoke oriented parameters such as the anode voltage, the necessary amplitude of deflection signals, the flyback tuning, the linearity correction for yoke resistance, and the S correction parameters. The program card is suitably an integral part of the CRT-yoke module. Thus, a standard set of electronic modules can be utilized in CRT displays with varying screen and neck sizes, deflection angles and anode potential. Production costs of the CRT displays can thereby be reduced in view of the larger quantities of standardized items produced. More importantly, the logistics of spares stocking is made more economical and less complex by the standardized modules at field installations.

The program card is made an integral part of the CRT module by hard-wiring or other means so that the possibility of human error is eliminated. For example, a program card calling for a G2 potential of 800 volts cannot be erroneously placed in operation with a CRT designed to operate at a G2 potential of 300 volts.

Further, the embodiment disclosed senses sync information and automatically switches between any two predetermined operating rates. A separate line rate card, including components determinative of the line rates, is utilized to further standardize the electronic modules of the display system.

DESCRIPTION OF THE DRAWING

A detailed description of the presently preferred embodiment of the present invention will hereinafter be described with reference to the accompanying drawing, wherein like numerals refer to like elements, and:

FIGS. 8a and 8b are schematic diagrams of suitable line rate module circuitry;

DETAILED DESCRIPTION OF THE PRESENTLY PREFERRED EXEMPLARY EMBODIMENT

Figure 1:
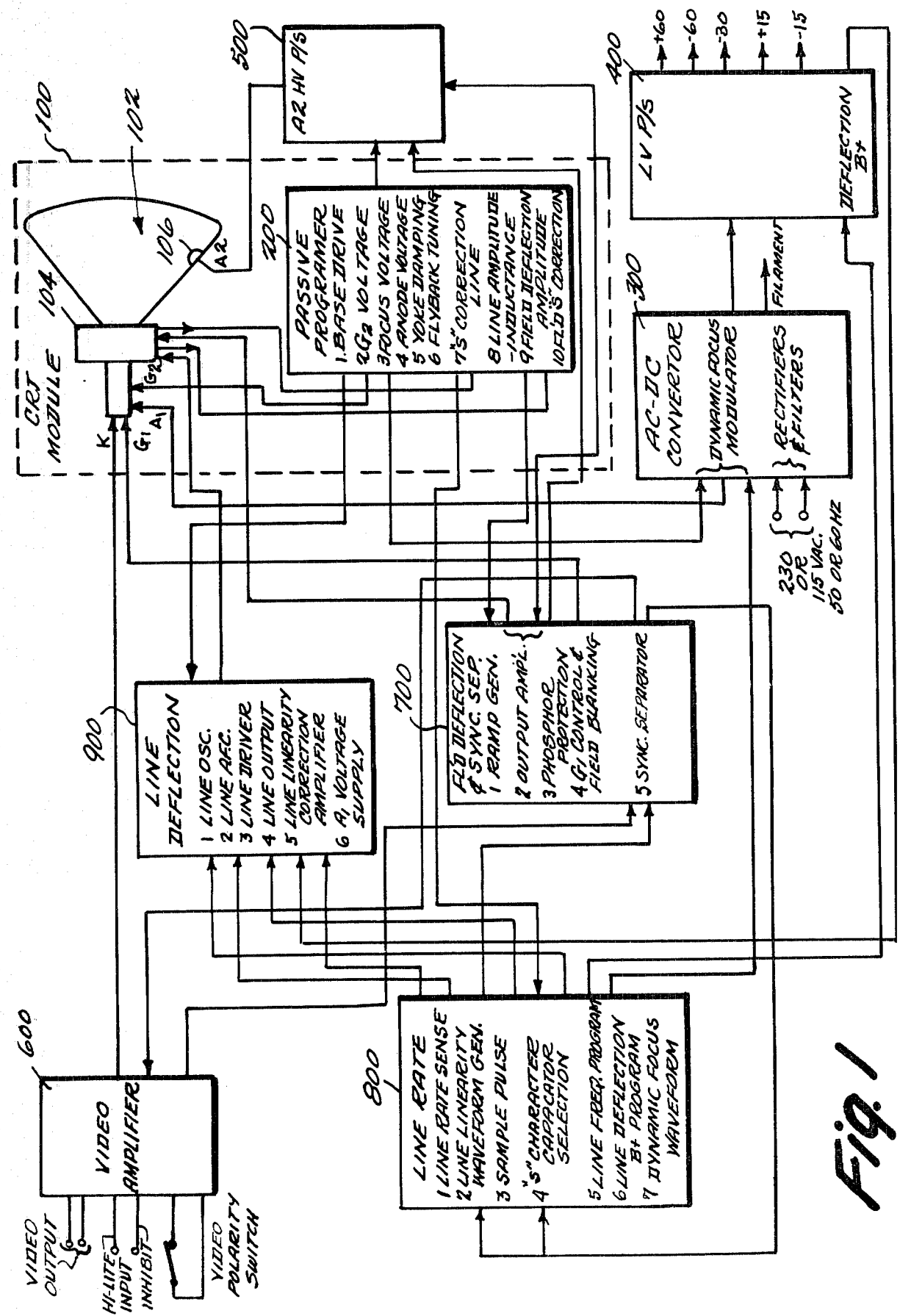
FIG. 1 is a block diagram of a CRT display system in accordance with the present invention.
Figure 2:
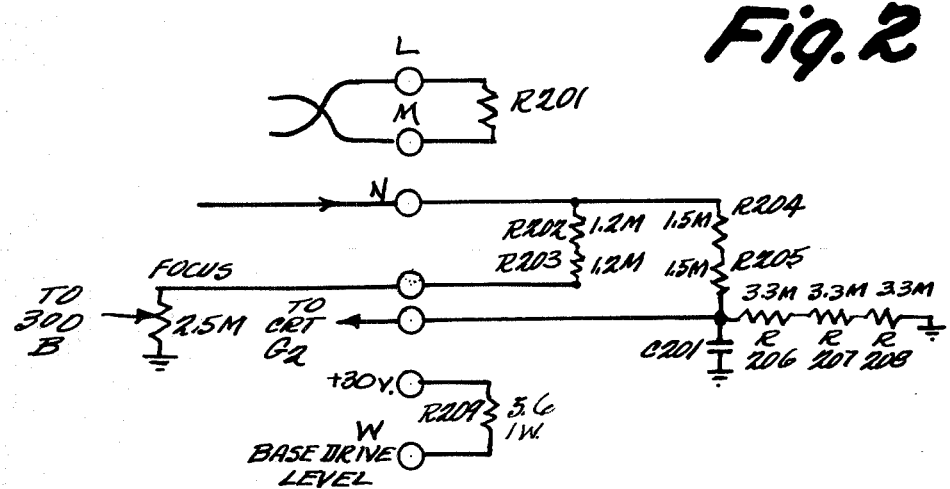
FIG. 2 is a schematic diagram of suitable program module circuitry.
Figure 2:
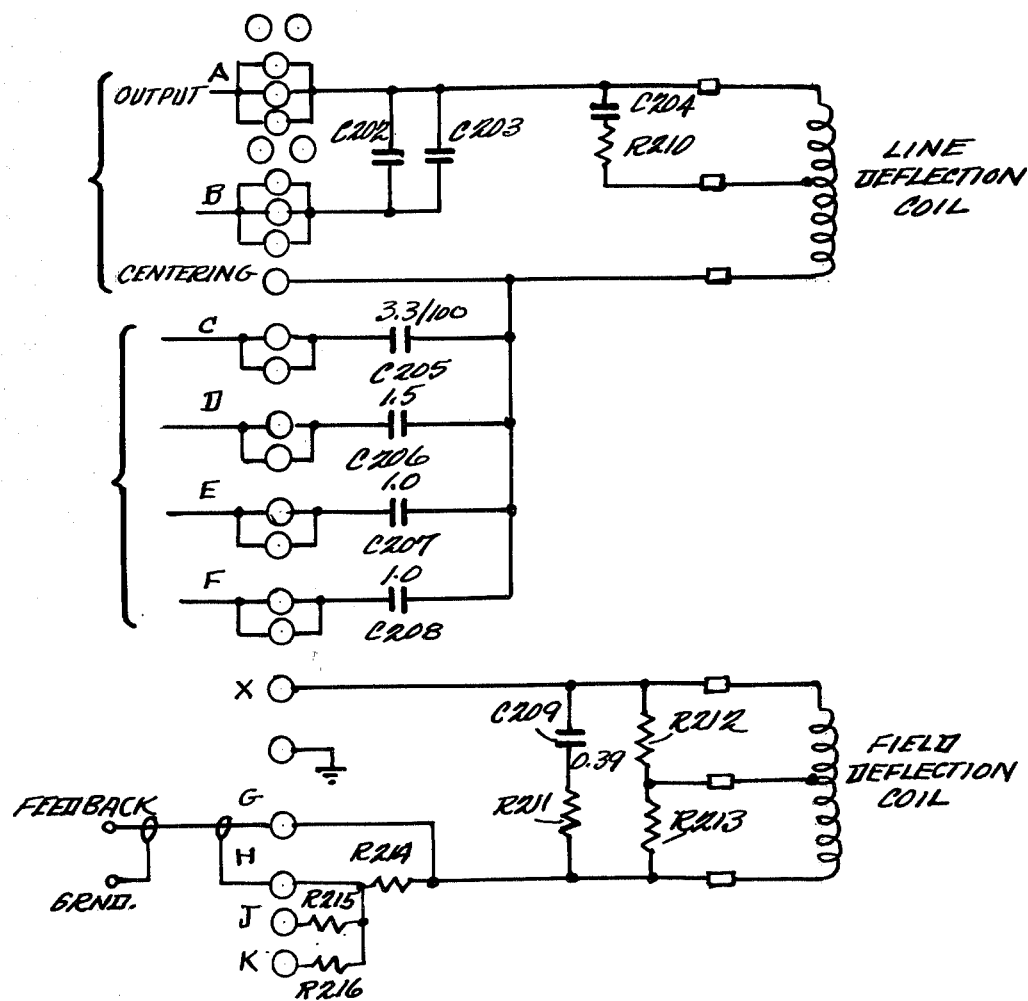

Referring now to FIG. 1, the presently preferred exemplary embodiment of a CRT display system in accordance with the present invention comprises a CRT module 100 including a CRT 102, a deflection yoke 104 bearing the line (horizontal) and field (vertical) deflection coils and a remote passive program sub-module (card) 200. Remote program sub-module 200 includes passive elements determinative of all CRT related parameters such as, the CRT base drive level, G2, focus, and anode biasing voltages, yoke damping and flyback tuning, line and field S correction parameters, and line and field deflection amplitudes. Referring briefly to FIG. 2, resistor 201 is coupled to a high voltage power supply module (500) to provide programming of the A2 anode voltage, controlling the energy in the electron beam and hence the brightness of the picture. Resistors $R_{202}$–$R_{208}$ and capacitor $C_{201}$, together comprise a circuit for controlling the focus voltage and G2 voltage, and are receptive of the A1 voltage from a line deflection module (900). Resistor $R_{209}$ operates to program the base drive level, cooperating with a line oscillator (902) and drive (906) in the line deflection module (900).

Capacitors $C_{202}$–$C_{208}$, and resistor $R_{210}$ are associated with the line deflection circuit. Capacitors $C_{202}$ and $C_{203}$ together determine the flyback capacitance $C_f$ and capacitors $C_{205}$–$C_{208}$ provide, in the parallel combinations selected by a line rate module (800), the various coupling capacitances $C_c$ required for proper S shaping of the various line rates. Capacitor $C_{204}$ and resistor $R_{210}$ provide damping for the line deflection coil.

Resistors $R_{211}$–$R_{216}$, and capacitor $C_{209}$ are associated with the field deflection circuitry. Resistors $R_{211}$–$R_{213}$, and capacitor $C_{209}$ provide damping for the field deflection coil. The deflection level is determined by resistor $R_{214}$, and the S correction break points are determined by resistors $R_{215}$ and $R_{216}$.

The functions of the various passive elements of program module 200 will be hereinafter explained in greater detail in conjunction with the modules, and functional systems with which they are associated.

Figure 3:
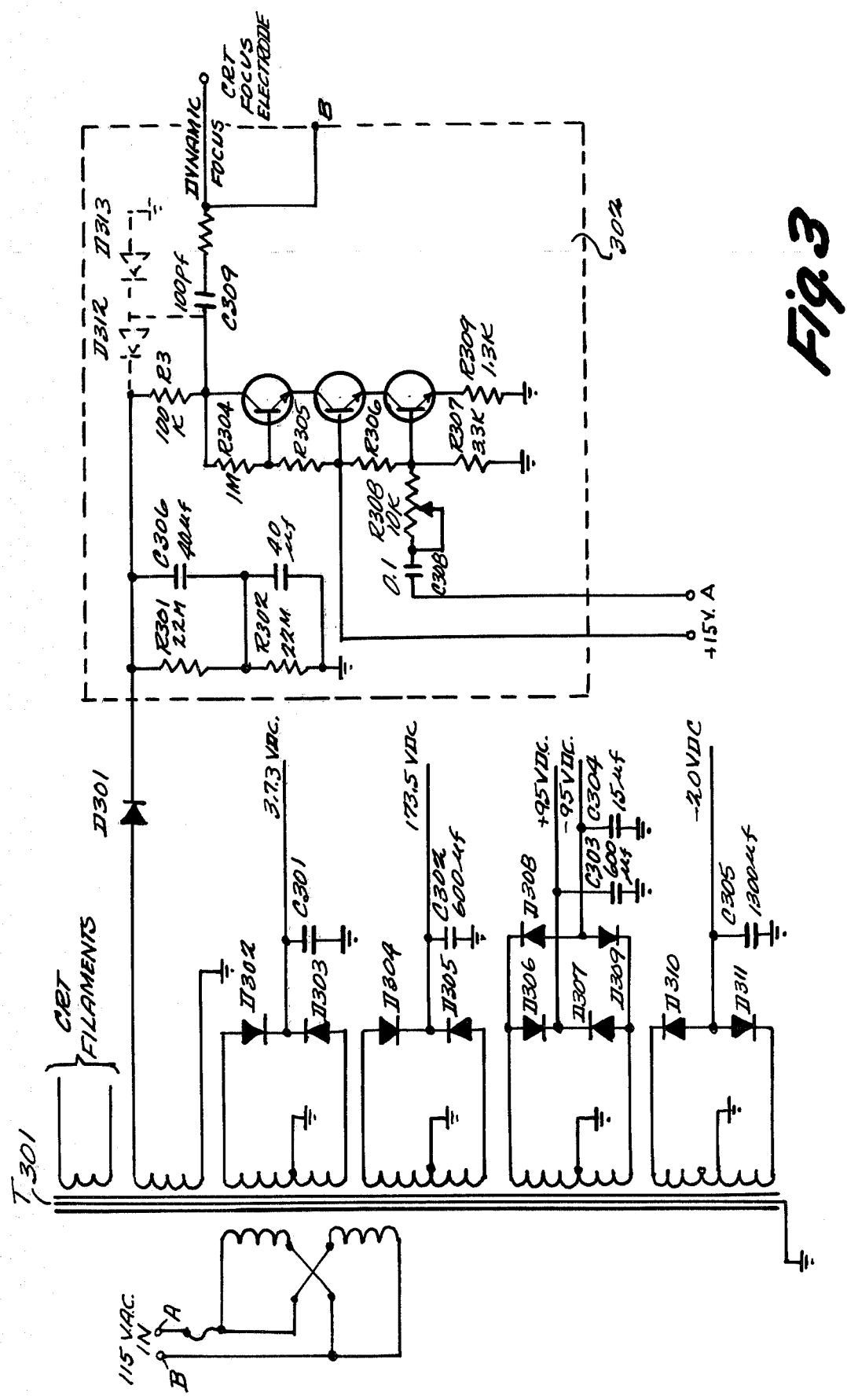
FIG. 3 is a schematic diagram of suitable AC to DC converter module circuitry.

The display system is powered from an applied line voltage, generally 115 or 230 volts AC at 50 or 60 Hz. The line voltage is applied to an AC to DC converter module 300, which provides rectified and filtered voltage to regulator module 400 and to a high voltage power supply module 500. Circuitry suitable for AC to DC converter 300 is shown in FIG. 3. A power transformer $T_{301}$ provides isolation from the power line and includes appropriate windings for producing all of the low DC voltages required for the display circuitry. Diodes $D_{302}$ through $D_{311}$ rectify the AC signal and capacitors $C_{301}$ through $C_{305}$ provide filtering for ripple. If desired, AC to DC converter module 300 can also include an amplifier 302 for converting a low voltage parabola (from a line rate module as will be explained) into a high voltage parabola on the order of 200 volts peak-to-peak for dynamic focusing of CRT 102.

Figure 4:
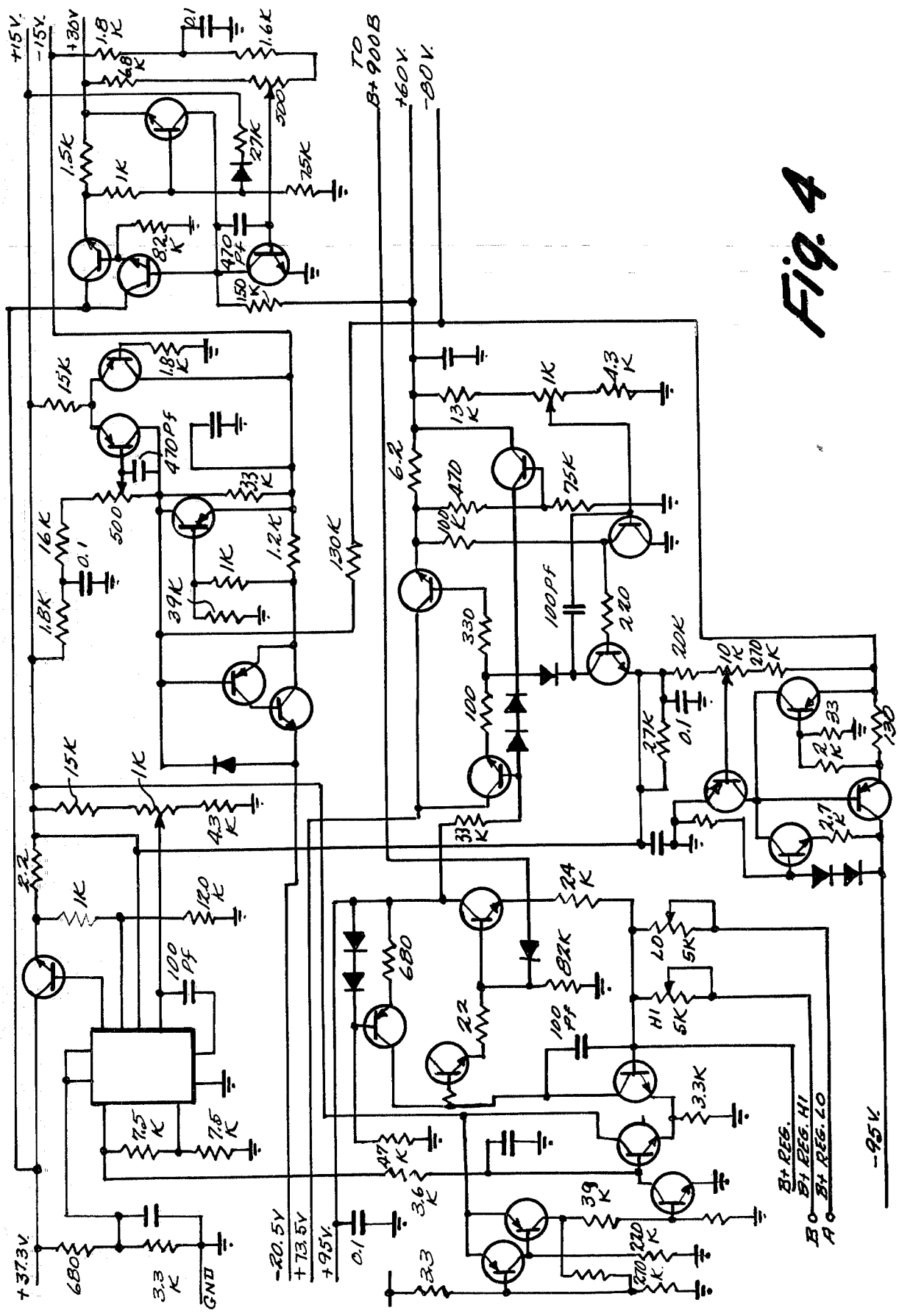
FIG. 4 is a schematic diagram of suitable low voltage regulator module circuitry.

Low voltage regulator module 400 suitably consists of conventional voltage regulation circuitry. For completeness, suitable regulator circuitry is shown in FIG. 4.

Figure 5:
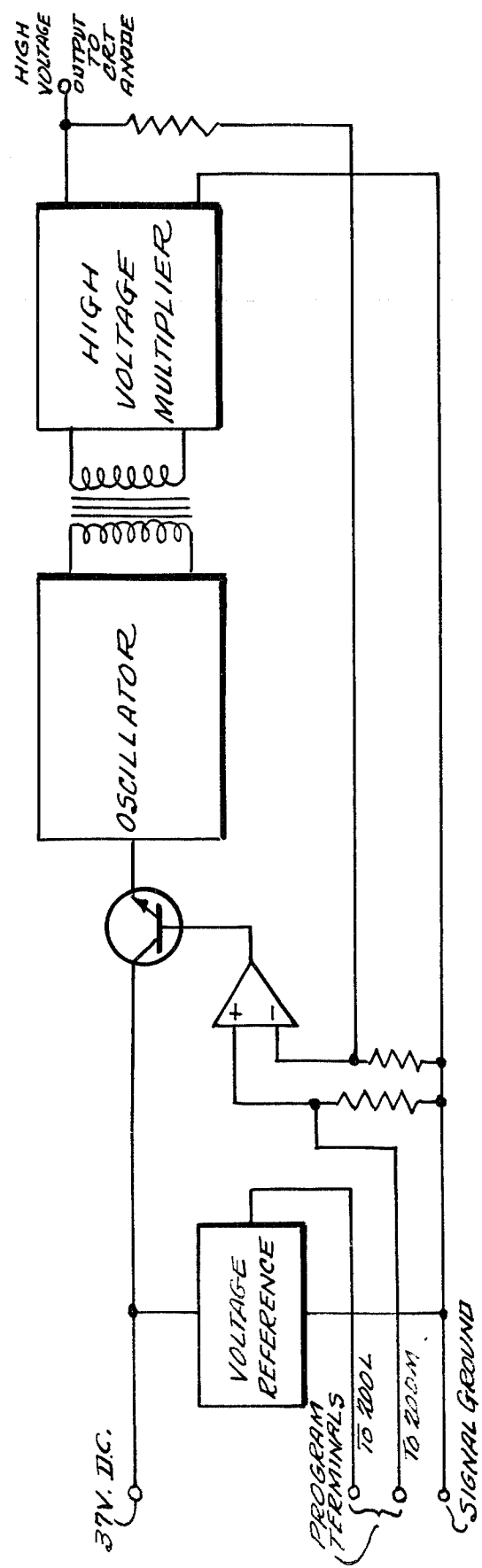
FIG. 5 is a schematic diagram of suitable high voltage power supply module circuitry.

High voltage power supply module 500 provides the A2 anode voltage to CRT 102, and is suitably any high voltage power supply of the type wherein the output voltage can be determined by a single resistor. The output voltage as determined by the resistor should range between 10 and 20 kilovolts to accommodate the various anode voltages required on different CRTs. As noted above, the A2 anode voltage is determined by resistor $R_{201}$ in remote programming module 200. It should be appreciated, that by including a programming resistor in the remote programming module 200, in addition to allowing a single standard high voltage power supply module to be used with CRTs having different required A2 anode voltages, a fail safe is provided, in that high voltage supply 500 is disabled if remote programming module 200 is disconnected for any reason. A block diagram of a suitable high voltage power supply is shown in FIG. 5.

Four standardized unitary modules cooperate with program card 200 to process the video signal and to effect the raster scan, a video amplifier module 600, a field deflection and sync separator module 700, a line rate module 800 and a line deflection module 900.

Figure 6A:
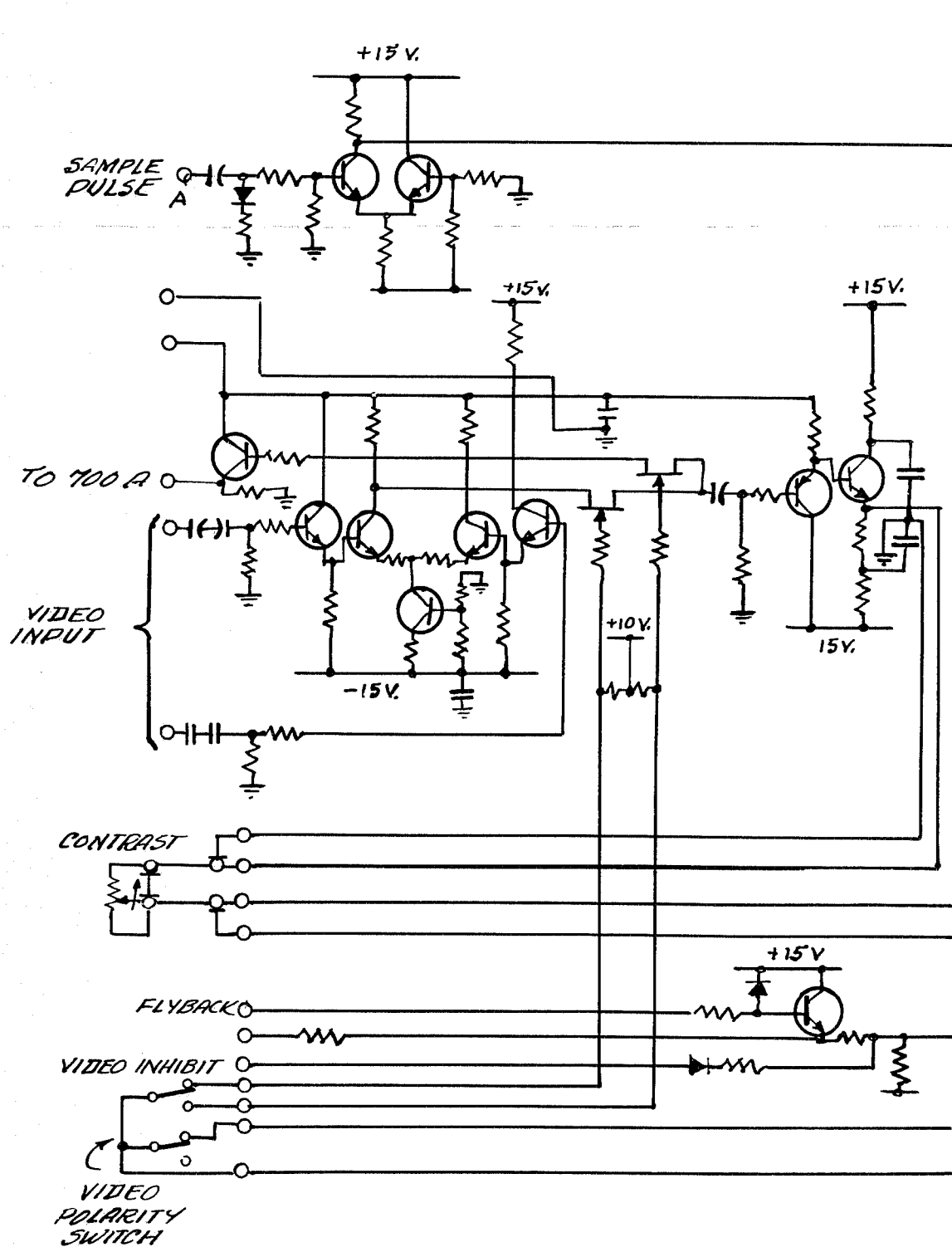
FIGS. 6a and 6b are schematic diagrams of suitable video amplifier module circuitry.
Figure 6B:
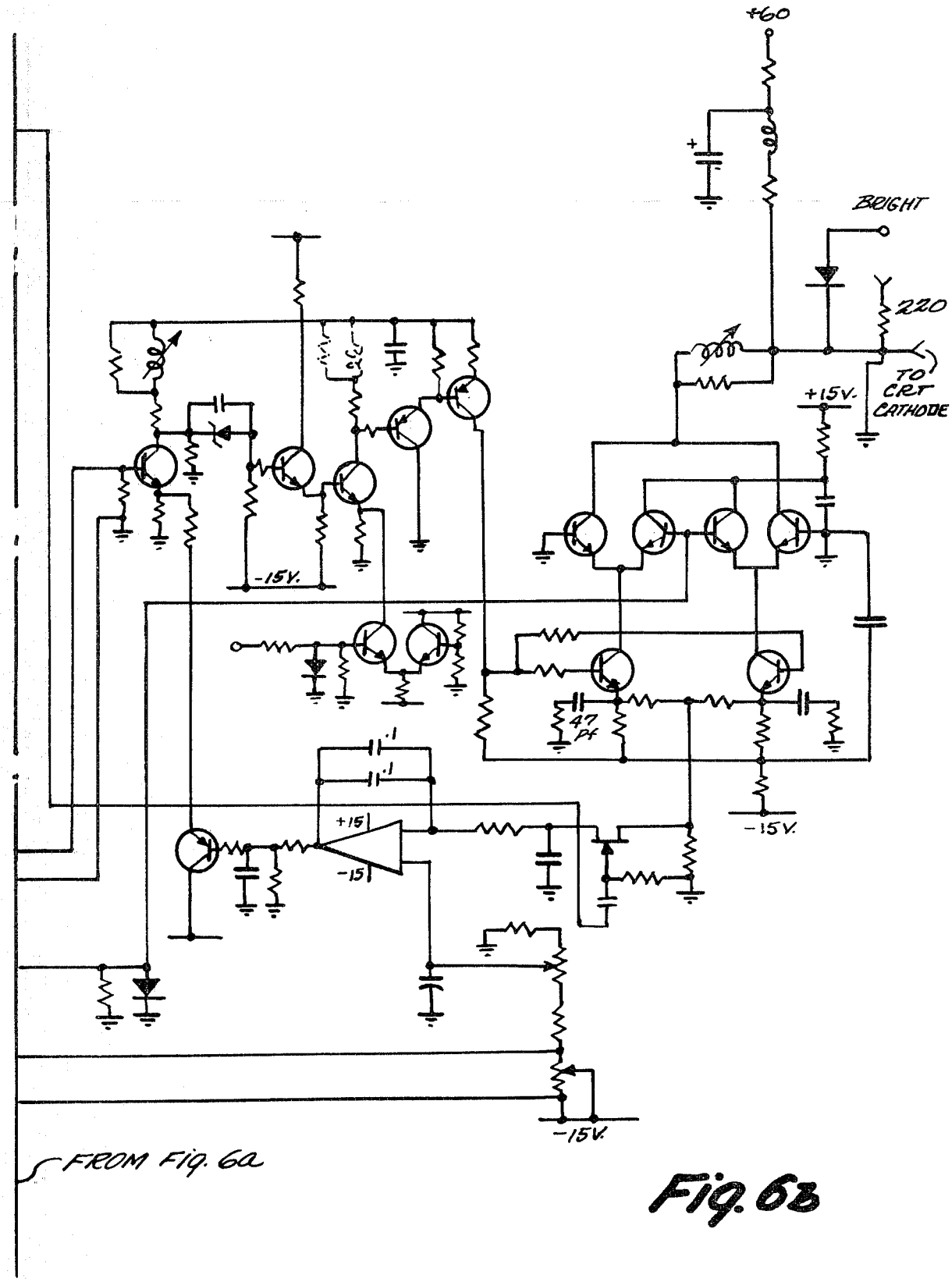

Video amplifier module 600 comprises any suitable circuitry for amplifying an applied composite video signal to the levels necessary to drive a wide variety of CRTs. The band width of the video amplifier is also preferably adequate for high line rate, e.g., 1229, operation. The schematic of a suitable video amplifier is shown in FIG. 6.

Field deflection and sync separator module 700 is receptive of a signal indicative of the composite video signal, and derives therefrom a signal indicative of the composite sync signal. The composite sync signal includes horizontal (line) and vertical (field) pulses and is described in detail in EIA standards RS-170 and RS-343-A. Separate line and field sync signals are generated from the composite sync signal. Field deflection and sync separator module 700 also preferably includes provisions for generating a field ramp waveform, phosphor protection, G1 voltage control and field blanking.

Figure 7A:
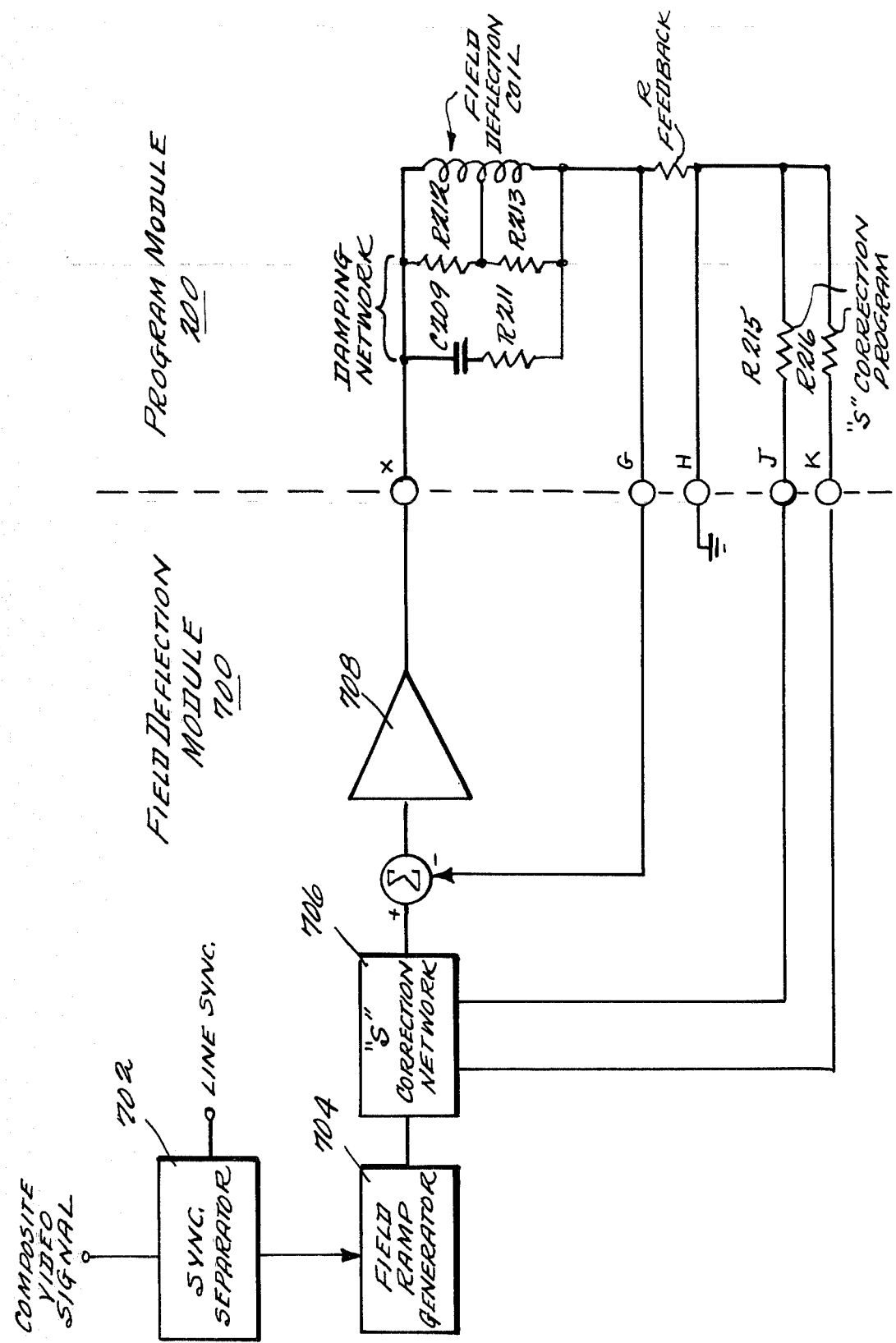
FIG. 7a is a block schematic of the field deflection system in a CRT display in accordance with the present invention.
Figure 7B:
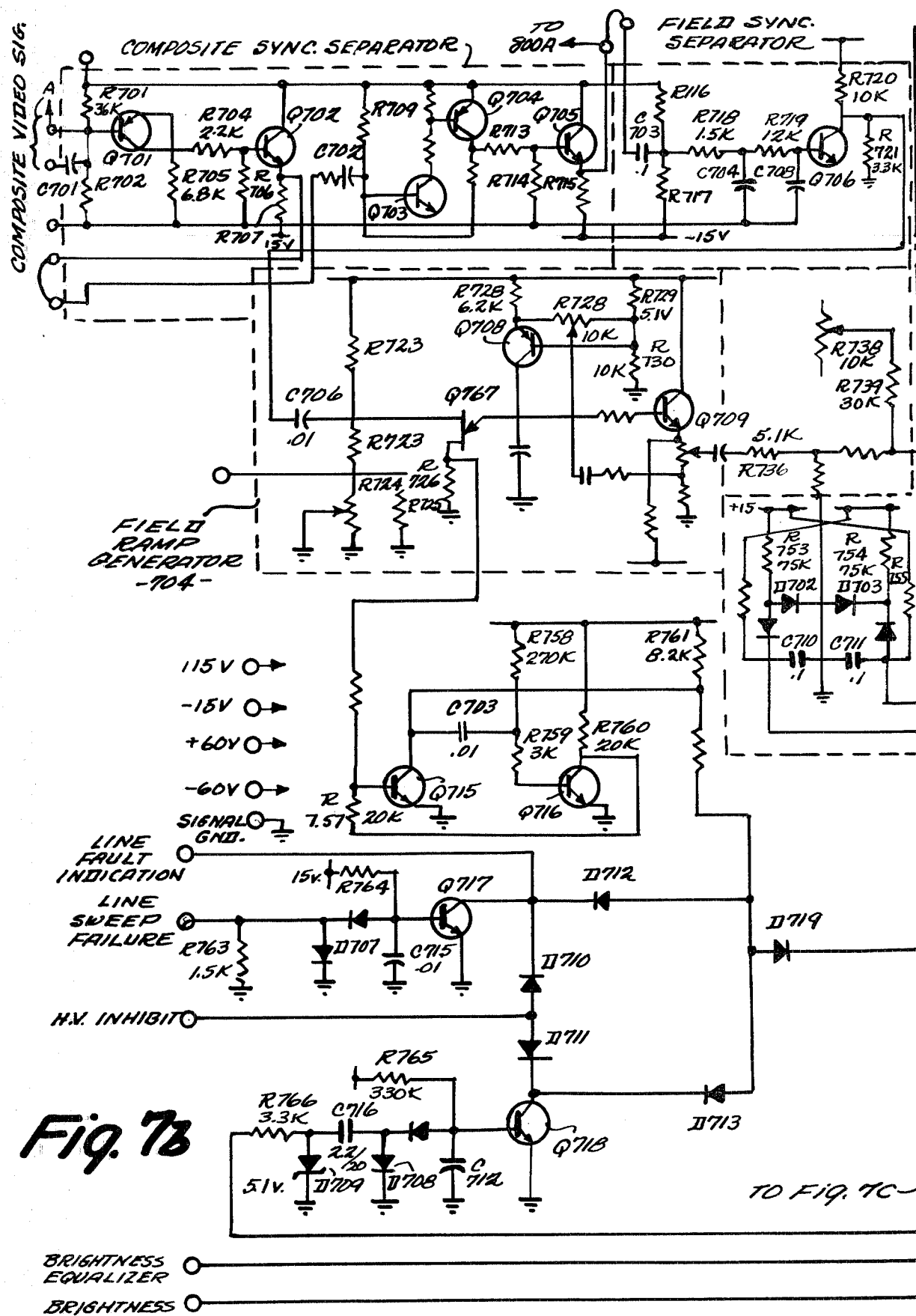
FIGS. 7b and 7c are schematic diagrams of suitable field deflection and sync separator module circuitry.
Figure 7C:
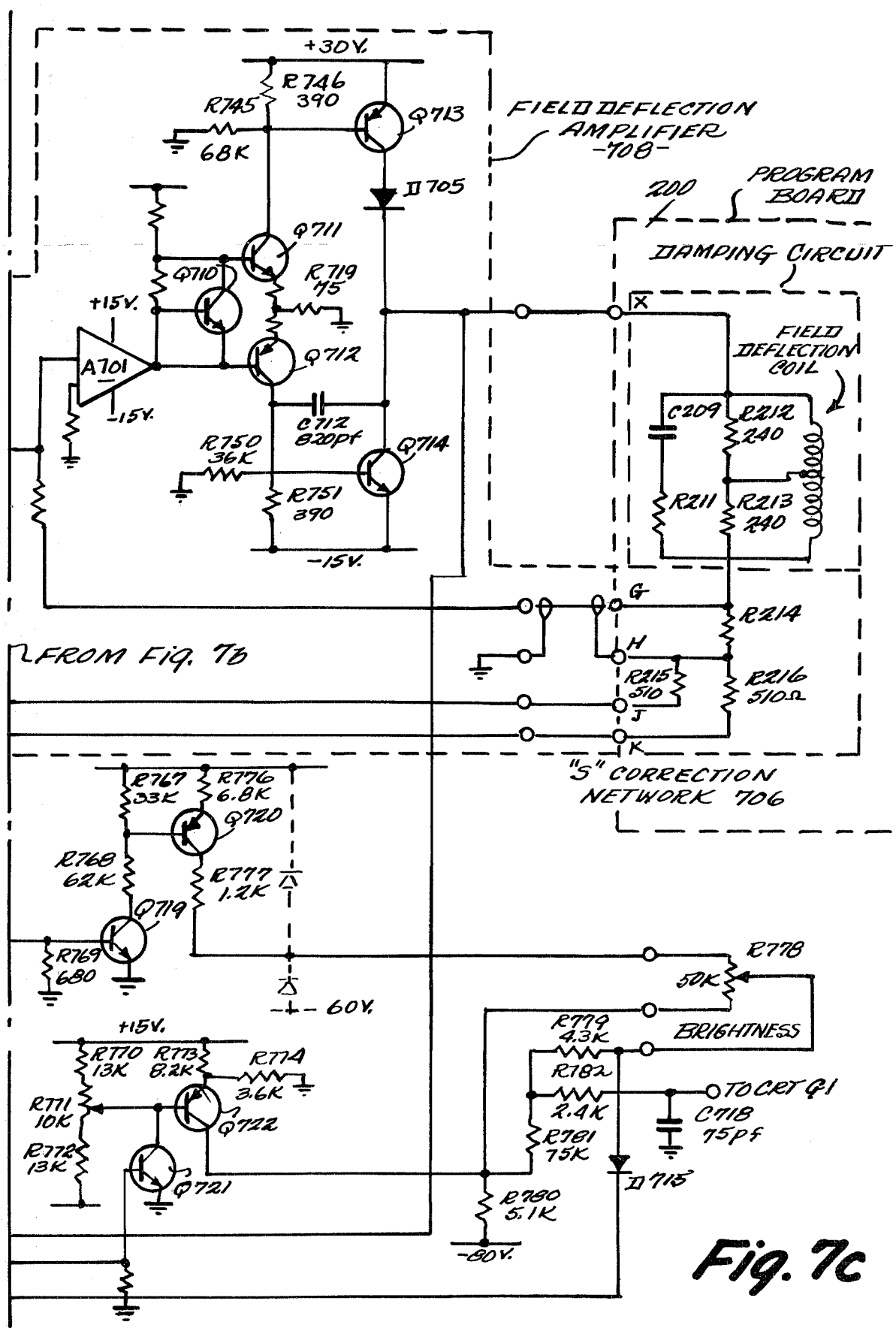

Field deflection and sync separator module 700 is shown in block diagram form in FIG. 7A, and suitable circuitry is shown in FIGS. 7b, 7c, et seq. With reference now to those figures, the composite video signal from video amplifier module 600 is applied to a sync separator circuit 702 comprising transistors $Q_{701}$ through $Q_{706}$, and associated components resistors $R_{701}$ through $R_{721}$ and capacitors $C_{701}$ through $C_{705}$. The composite sync signal is separated from the composite video and appears at the emitter of $Q_{705}$. The composite sync is then applied to a vertical (field) sync separator comprising transistor $Q_{706}$, resistors $R_{716}$ through $R_{721}$ and capacitors $C_{703}$ through $C_{705}$. The vertical (field) sync separator acts as a low pass filter and discriminates against the faster horizontal (line) sync pulses, allowing only the field sync pulse to pass through. The composite sync signal is applied to the line rate module 800 where the horizontal (line) sync is separated from the composite sync in a pulse shaper 802 (to be described). The line sync separator is located in line rate module 800, in the preferred exemplary embodiment, in view of component value dependence on the line rate, as will be explained. The field pulses are coupled through a capacitor $C_{706}$ to a field ramp generator 704, including transistors $Q_{707}$–$Q_{709}$ and associated circuitry. The output of field ramp generator 704 is applied to a field S correction network 706 comprising diodes $D_{701}$ through $D_{704}$, resistors $R_{752}$ through $R_{755}$, and capacitors $C_{710}$ and $C_{711}$. Connectors are provided for connecting remote resistances ($R_{215}$ and $R_{216}$) on the remote program card 200 into the S correction network. Field S correction network 706 is a non-linear attenuator which attenuates signals above a first break point value and below a second break point value, to convert the sawtooth signal provided by field ramp generator 704 into an "S" shaped curve in accordance with the geometry of the particular CRT 102. As noted above, such break point values are determined by resistors ($R_{215}$ and $R_{216}$) located in the program module. S correction network 706 is coupled to a field deflection amplifier 708 including an operational amplifier $A_{701}$, transistors $Q_{710}$–$Q_{714}$, and associated circuitry. A connector is included to couple feedback resistor $R_{214}$ disposed in a remote program module 200 into the feedback loop of amplifier $A_{701}$. Resistor $R_{214}$ converts the field deflection coil current to a voltage in accordance with the particular deflection coils used to determine the deflection level, as noted above. The voltage across $R_{214}$ is applied as feedback to amplifier $A_{701}$ to insure that the field deflection current follows the S-shaped ramp from the S correction network 706. Voltage to current conversion of the amplifier, and hence the deflection level, is programmed by feedback resistor $R_{214}$, on remote programming card 200. Field "S" shaping is similarly tailored to the particular CRT by resistors $R_{215}$ and $R_{216}$ in remote programming module 200. All field deflection parameters associated with the characteristics of the particular CRT 102 are thus determined by the passive components in remote programming card 200. Thus a standard module for field deflection and sync separation (700) can be utilized with varying sized CRTs.

Figure 8B:
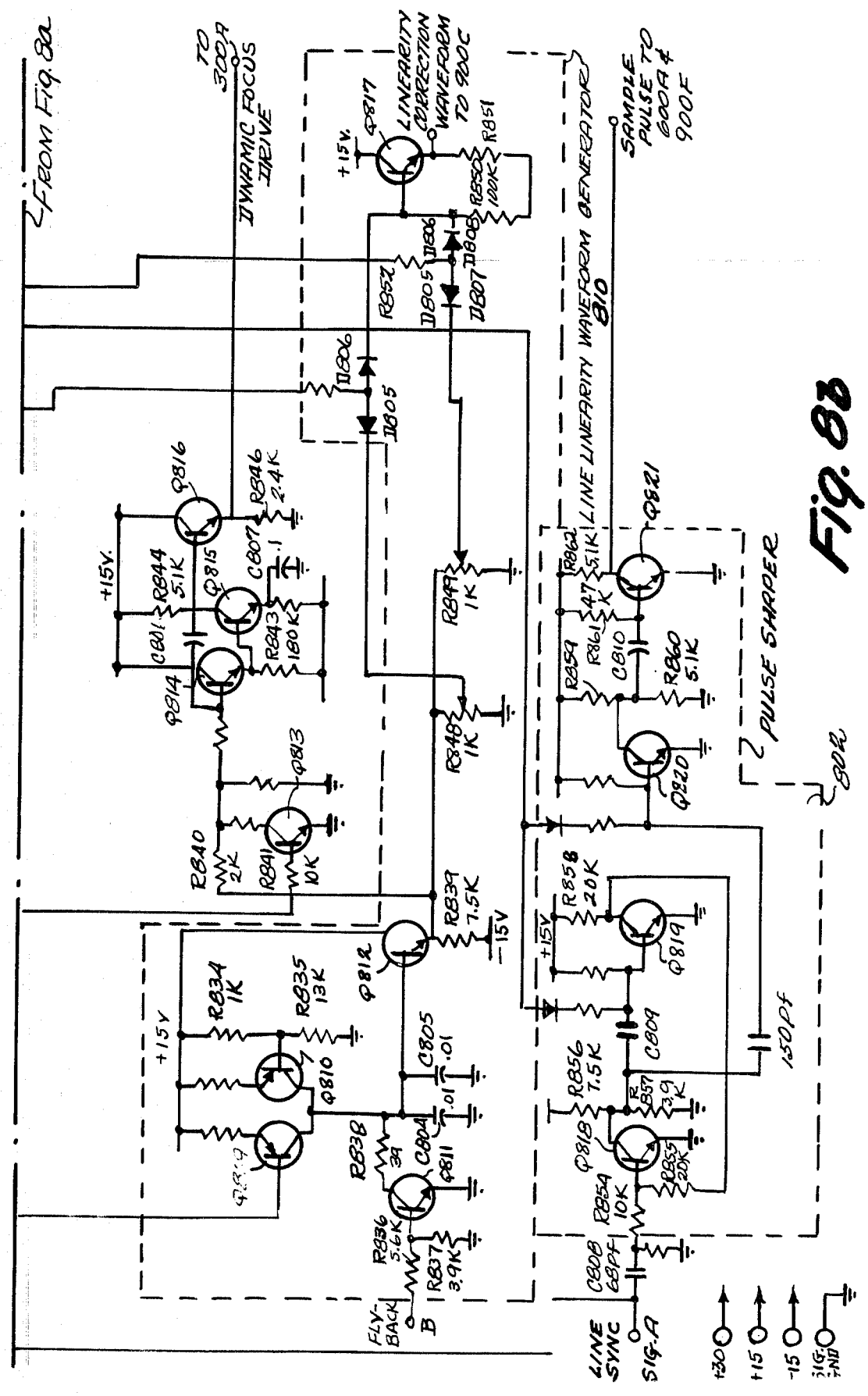

Line rate module 800 and line deflection module 900 cooperate with program module 200 to generate the line deflection waveforms to CRT 102. Line rate module 800 is included primarily for providing operation at a plurality of line rates, that is, number of lines per frame as determined by the relative frequencies of the horizontal and vertical sync pulses in the composite video signal. Standard television transmissions include 525 lines per frame, while various high resolution systems utilize from 675 lines per frame to 1229 lines per frame. Line rate module 800 includes elements to program all circuits for which performance must be varied with different line rates. These generally include circuits associated with a line linearity ramp waveform, selection of an S correction shaping capacitance $C_c$ (located on remote submodule 200), the line VCO center frequency, B+ voltage, dynamic focus and brightness equalization, as will be explained. In the preferred exemplary embodiment, all component values that are unique to line rate, as opposed to CRT structure, are physically located on line rate module 800, and are dedicated to two specific line rates. It will be appreciated that a larger plurality of line rates can be accommodated, if desired. Similarly, if the display system is to be dedicated to a single line rate, line rate module 800 would include only a line linearity waveform generator and jumper-type connections. If an entire series or line of displays are to be dedicated to a single line rate, line rate module 800 could be deleted altogether, and the line linearity waveform generator incorporated in the line deflection module 900. A schematic for suitable circuitry for line rate module 800 is shown in FIG. 8. The line sync signal is applied to a pulse shaper 802 comprising transistors $Q_{818}$–$Q_{821}$, and associated circuitry. The transistors operate as one shots to generate a sample pulse in accordance with the line sync signal for controlling a line rate voltage controlled oscillator (902) in line deflection module 900. The line sync signal is also applied to a discriminator (frequency to voltage converter) 804 comprising transistors $Q_{801}$ and $Q_{802}$ and associated circuitry, the output of which is applied to a comparator 806. The output signal of comparator 806 is thus indicative of one of two line rates. The comparator output signal is utilized to control a relay $K_{801}$ in capacitor selector circuit 808 to complete appropriate connections to couple one or more capacitors ($C_{205}$–$C_{208}$ in program module 200) into the line deflection system, as will be explained, as well as to program the line rate linearity waveform, the line VCO center frequency, B+ voltage, dynamic focus amplitude, and brightness equalization.

As noted above, line rate module 800 also includes a line linearity waveform generator 810. In the exemplary circuitry shown in FIG. 8, line linearity waveform generator 810 comprises transistors $Q_{809}$–$Q_{812}$, and $Q_{817}$, and associated circuitry, and generates a ramp shaped waveform to compensate for resistance in the line deflection system, as will be explained. The remainder of the circuitry in module 800 provides signals indicative of the line rate to various circuits in the display system.

Figure 9A:
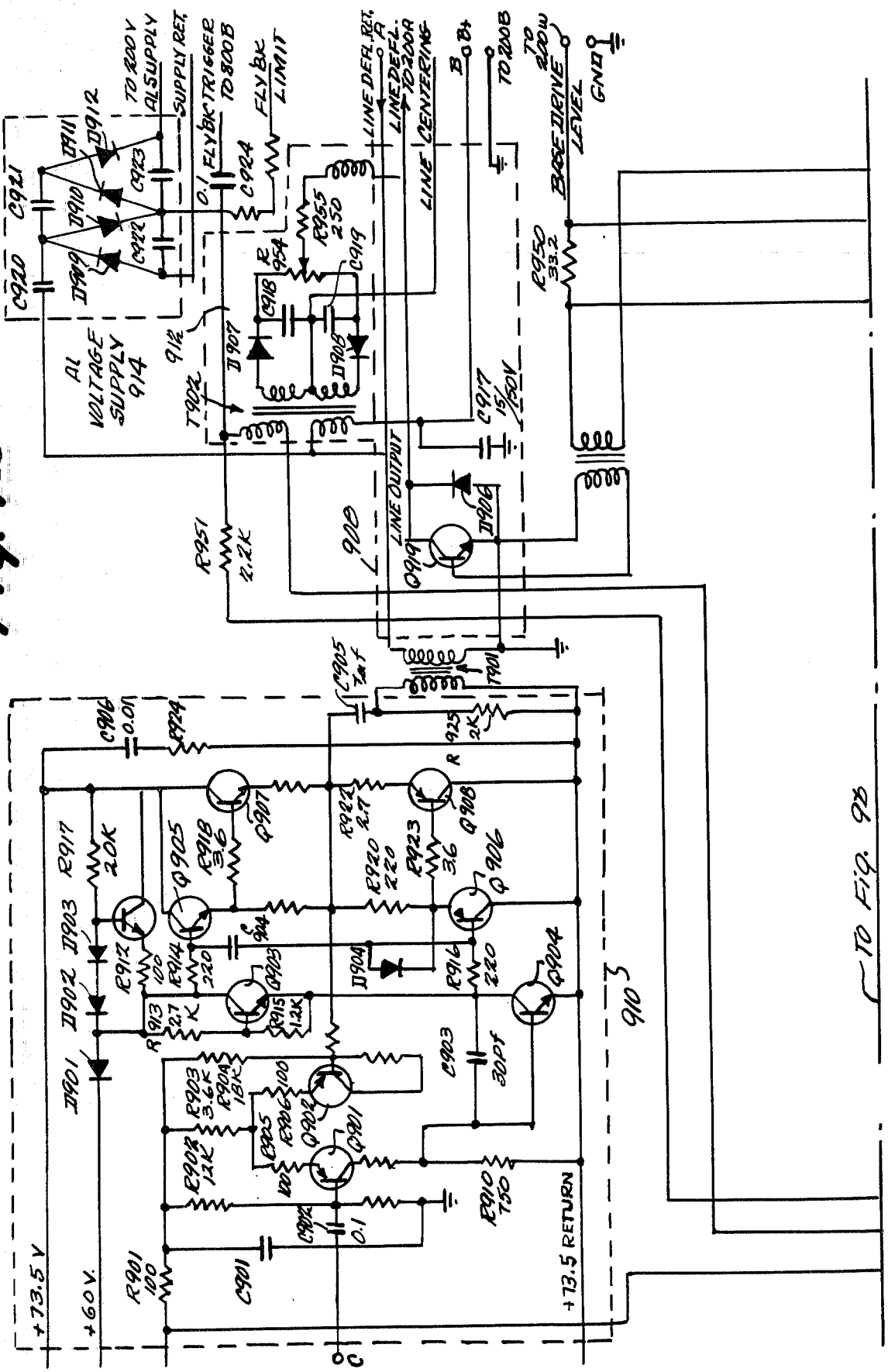
FIGS. 9a and 9b are schematic diagrams of suitable line deflection module circuitry.
Figure 9B:
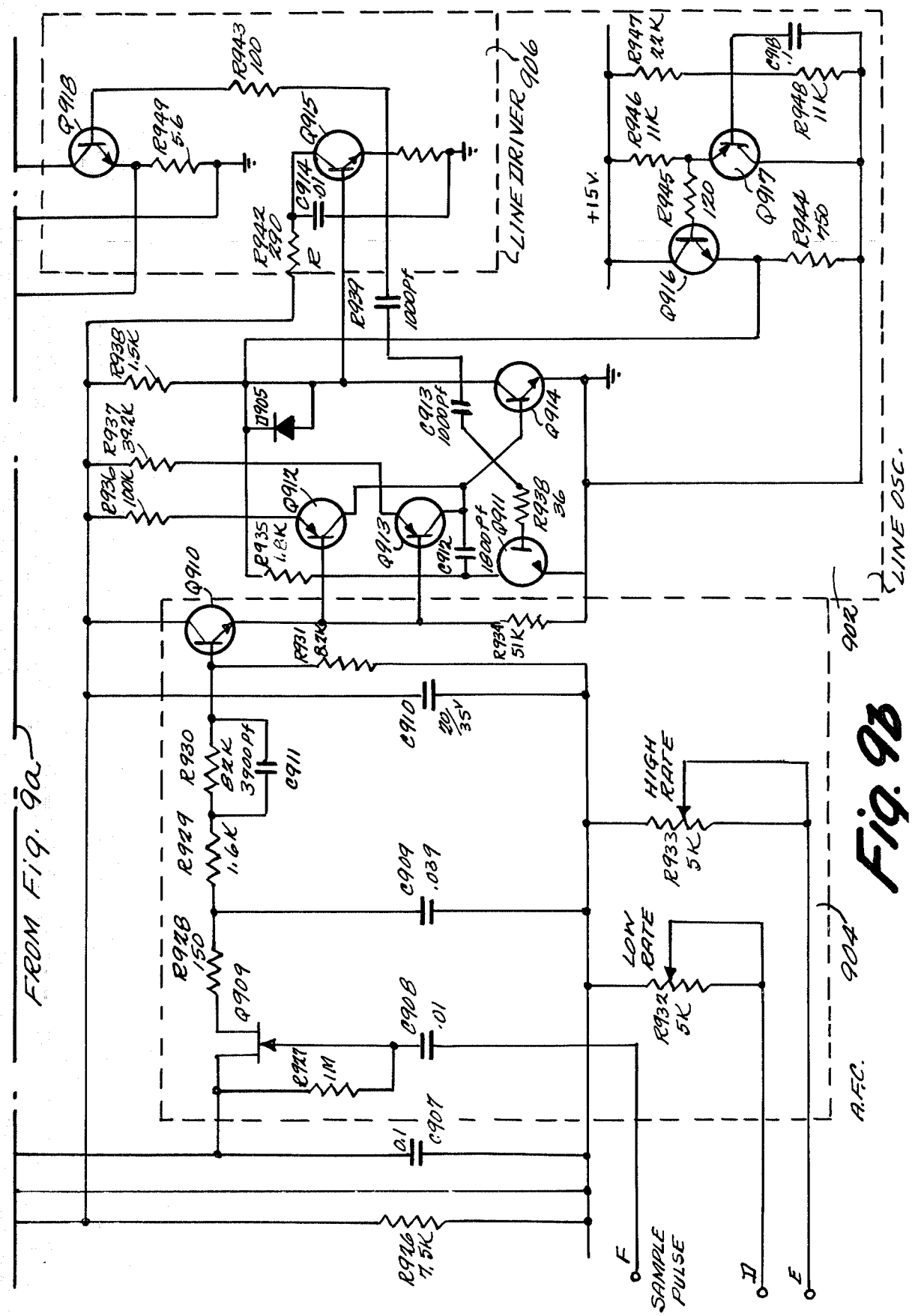

A schematic diagram of suitable circuitry for line deflection module is shown in FIG. 9. Line deflection module 900 suitably includes a line deflection oscillator 902, line automatic frequency control 904, a line drive 906, a line output circuit 908, a line linearity correction amplifier 910, a line centering circuit 912, and a voltage supply 914 for the A1 anode of CRT 102. The line correction waveform from line rate module 800 is applied to a linearity correction amplifier 910 wherein it is amplified to an appropriate level. Amplifier 910 is suitably a class AB push-pull type power amplifier with wide bandwidth. The output of amplifier 910 is coupled through a transformer $T_{901}$ to the line deflection coils (in CRT module 100).

Figure 10:
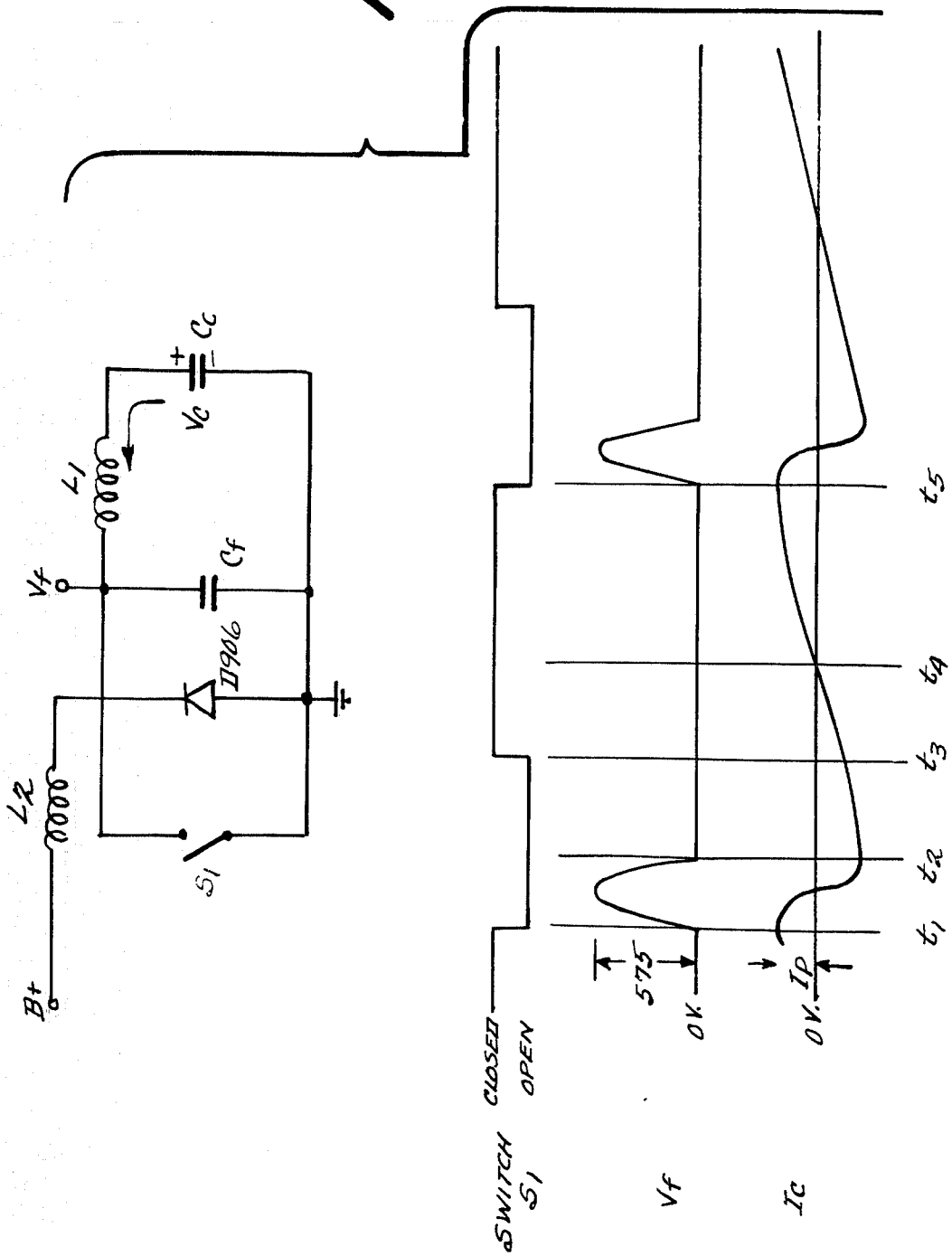
FIG. 10 is a simplified schematic of the line deflection oscillator.

Line output circuit 908 is suitably, in effect, a conventional energy recovery system of the type shown schematically in FIG. 10, and is driven switched in synchronism with the line sync pulses by line oscillator 902, $AFC_{904}$ and line driver 906. The switching portion of the energy recovery circuit, transistor $Q_{919}$ and diode $D_{906}$, are located in the standardized line deflection module 900. The energy recovery circuit utilizes the inductance of the line deflection coil in yoke 104 and accordingly, the flyback capacitance $C_f$ and coupling capacitance $C_c$ are dependent upon the particular characteristics of that deflection coil. The components determining capacitances $C_f$ and $C_c$ are removably connected to switching portion 909 and therefore situated in remote program module 200. Briefly, in the operation of such an energy recovery circuit, after the circuit has attained a steady state, capacitance $C_c$ charges to a voltage $V_c$ substantially equal to the B+ supply voltage. Capacitance $C_c$ is determined by the inductance of the line deflection coil, the "S" shaping requirements and the line rate. Generally $C_c$ is much larger than $C_f$. Assuming switch S1 to be initially closed, and the circuit operating on its steady state, switch S1 is opened when the current I through the deflection coil is equal to its maximum value $I_p$ at time $t_1$. As switch S1 is opened, the energy in the deflection coil charges the flyback capacitance $C_f$, producing a flyback voltage pulse, $V_f$. The flyback capacitance $C_f$ and the deflection coil effectively form a tuned circuit. Flyback capacitance $C_f$ is chosen to resonate with the line deflection coil inductance at a frequency such that one-half cycle occurs within a predetermined blanking period. The voltage across $C_f$ thus oscillates until the voltage across $C_f$ returns to zero and begins to go negative (at time $t_2$) whereupon diode $D_{906}$ becomes conductive. The effective tuned circuit thus becomes the deflection coil and coupling capacitance $C_c$. As noted above, coupling capacitor $C_c$ is chosen to create an "S" shaped current waveform during the time between $t_2$ and $t_5$. The current path is initially through diode $D_{906}$ a predetermined period, but switch S1 is closed prior to current $I_c$ going positive to provide the current path during the latter part of the period. At the end of the period (at $T_5$), the current again reaches peak value $I_p$, switch S1 is again opened and the cycle is repeated. Inductor L2 is a choke, providing isolation from the B+ power supply. In general, the value of inductor L2 is much larger than the inductance of the deflection coils and does not effect the operation of the circuit.

Figure 11:
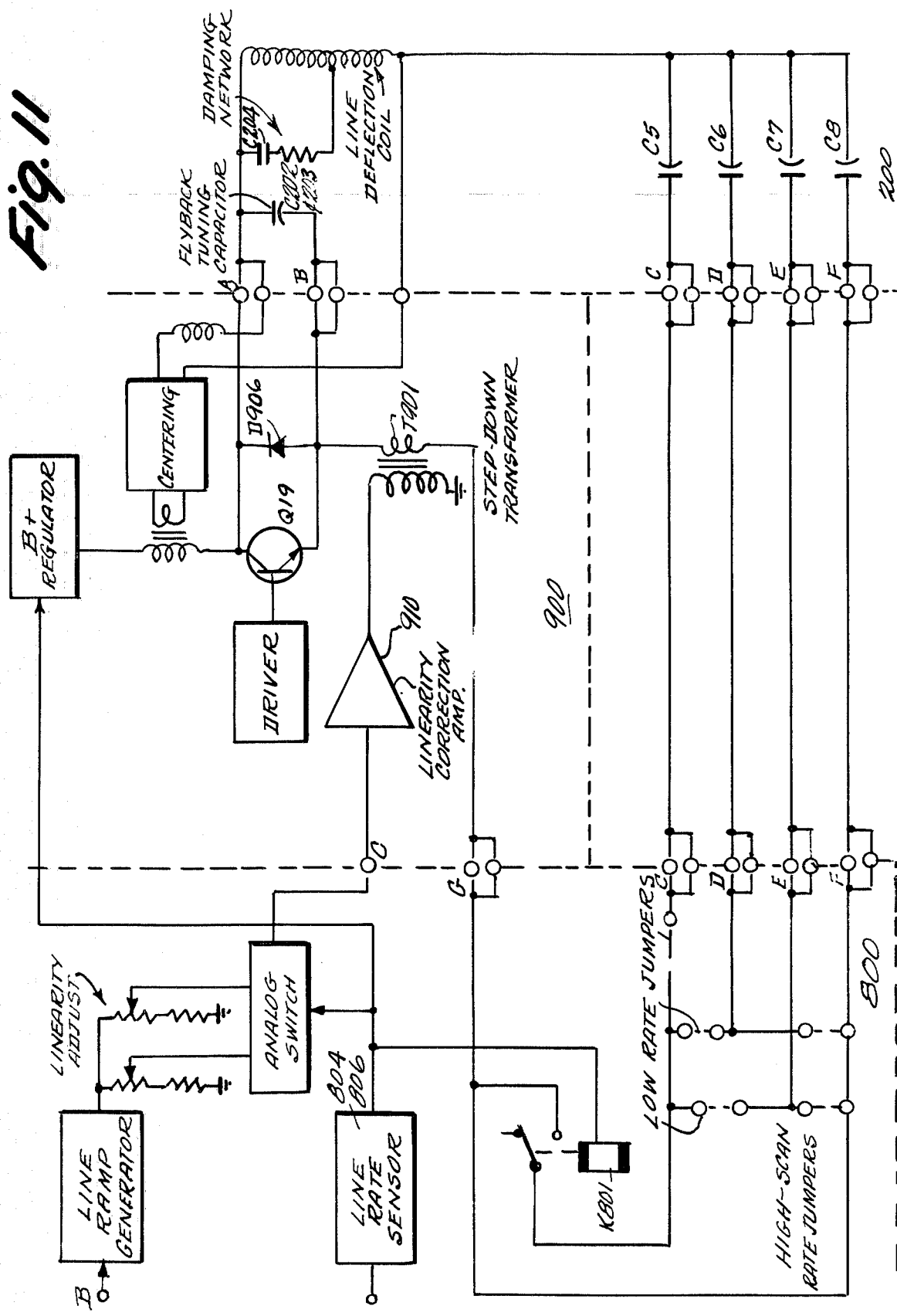
FIG. 11 is a block schematic diagram of the line deflection system in a CRT display in accordance with the present invention.

The values of flyback capacitance $C_f$ and coupling capacitance $C_c$ are, it should be appreciated, functions of the particular deflection coil. Accordingly, elements determinative of such capacitances are removably connected into the circuit and disposed in remote programming submodule 202. Capacitors are included in remote program card 200 to provide the proper $C_c$ at a plurality of line rates, line rate module 800 operating to connect the proper capacitor or combinations of capacitors into the circuit. Four capacitors $C_{205}$–$C_{208}$ are disposed in programming module 200, removably connected to line rate module 800, as illustrated in FIG. 11. Relay $K_{801}$ of coupling capacitor selector 808, operates in response to the output of the line rate sensor to connect various combinations of the four capacitors in program module 200 in parallel and connecting the parallel combination into the line deflection oscillator. Thus, a value of coupling capacitance appropriate for the various line rates can be achieved. It should be noted that at least one capacitor can be hard into the circuit, so that the monitor will remain functional, though at a reduced linearity, should relay $K_{801}$ fail. It should be noted that while in the preferred exemplary embodiment line rate module 800 chooses between two separate line rates, capacitors $C_{205}$–$C_{208}$ are chosen such that the coupling capacitance $C_c$ for any of a large plurality of line rates between, for example, 525 and 1229, may be achieved. Thus, a particular CRT module 100 with a given type CRT 102 and a single type of program module 200, is operable at the various line rates, again providing for standardization of parts.

The above description of the operation of the line deflection waveform is overly simplified in that it neglects the effects of the resistance of the line deflection coil. In addition, it should be noted that the line deflection coil is generally built of two separate coils each disposed on opposite sides of the CRT neck. The two coils generally vary in self-resonant frequency. Accordingly, a damping circuit is included in program module 200 comprising resistors $C_{204}$ and $R_{210}$, connected to the center tap of the deflection coil, to dampen any ringing existing internal to the line deflection coil. A similar damping circuit comprising resistors $R_{211}$–$R_{213}$ and capacitor $C_{209}$ is included on remote program module 200 in association with the field deflection circuitry.

The winding resistance of the line deflection coil tends to make the deflection current non-linear. It has been found that a ramp of voltage can be injected into the line deflection circuitry to, in effect, cancel the non-linearities due to the line deflection coil resistance. Ideally, where there is no resistance in the circuit, the voltage across the line deflection coil is equal to the coil inductance times the time derivate of the deflection current. However, the winding resistance generates a voltage drop equal to the product of the instantaneous deflection current times the resistance, i.e., a ramp voltage. A voltage ramp is thus injected into the circuit to negate the effects of the voltage dropped by the line deflection coil winding resistance. Previous systems have generally utilized feedback type systems similar to field deflection amplifier 708 with direct coupled amplifiers driving the line deflection coil to inject the correction ramp. In the presently preferred exemplary embodiment of the present invention, however, the linearity correction amplifier 910 is transformer coupled to the deflection coil by transformer $T_{901}$. Such transformer coupling provides impedance matching, with resultant power savings and reduction in parts. Since linearity correction amplifier 910 is transformer coupled into line output circuit 908, the amplifier can operate from an unregulated power supply. A direct coupled amplifier generally requires two low voltage high current supplies, each much more complicated than a unregulated supply.

Further, a time error is often interjected into the line deflection waveform, i.e., switching of transistor $Q_{919}$ is slightly out sync with the video information, due to to deviations in the composite video signal within the tolerances set out in EIA standards. Such timing errors introduce a linearity error because of S correction phasing. The present inventors have found that such time errors can also be compensated for by an injected ramp signal. The overall amount of ramp voltage that must be used to obtain linearity correction is thus not only a function of the particular yoke resistance but also a function of the phase of the line deflection current with respect to the video signal.

The operation of the line output circuit 908 can be considered to, in effect, produce a sawtooth current waveform, which operates to generate a parabolic voltage waveform across capacitor $C_c$. The parabolic voltage, in turn, operates to create a third order current waveform having a phase opposing a basic sawtooth waveform to roll the ends of the sawtooth waveform and provide an S correction to account for the geometry of the CRT face.

Consider a parabolic waveform over the scanning interval t=−T/2 to t=T/2. The equation for the voltage parabola is:

$$v(t) = K_1 t^2. \quad (1)$$

When t equals T/2, the voltage has a maximum value, $$V\text{ max} = K_1(T^2/4)$$

or $$K_1 = (4V\text{ max})/T^2. \quad (2)$$

Now consider a timing error $\tau$ due to a phase variation between the line deflection current and the video signal:

$$V(t-\tau) = K_1(t-\tau)^2. \quad (3)$$

Expanding equation 3

$$V(t-\tau) = K_1 t^2 - 2t\tau K_1 + K_1 \tau^2. \quad (4)$$

Define a new function $\phi$ by the equation:

$$\phi(t,\tau) = v(t) - v(t-\tau) = K_1(2t\tau - \tau^2). \quad (5)$$

Substitute equation 2 into 5, $$\phi(t,\tau) = \frac{4V\text{ max}}{T^2}(2t\tau - \tau^2). \quad (6)$$

The function $\phi$ represents an error voltage consisting of two components, a ramp $\phi_r$ (from times −T/2 to T/2) equal to:

$$\phi_r(t,\tau) = \frac{8V\text{ max } t\tau}{T^2}$$

and a constant component $\phi_c$ equal to:

$$\phi_c(t,\tau) = \frac{4V\text{ max } \tau^2}{T^2}.$$

This constant term is negligible and can generally be ignored.

The peak amplitude of the ramp (at time T/2) is obtained by replacing t by T/2 which results in:

$$\phi_r \text{ peak} = \frac{4V\text{ max } \tau}{T}.$$

Thus, the peak-to-peak value of the ramp $(-\phi_r(T/2) - \phi_r(-T/2))$ is:

$$\phi_r p\text{-}p = \frac{8V\text{ max } \tau}{T}. \quad (7)$$

It can be shown that:

$$V\text{ max} = \frac{I_p T}{4C_c}. \quad (8)$$

Where $I_p$ is the deflection current at time T/2, substituting this into 7 yields, $$\phi_r p\text{-}p = \frac{2I_p}{C_c}\tau. \quad (9)$$

As noted above, a correction ramp is injected to correct for the non-linearities caused by the resistance of the line deflection coil. The total ramp thus required is:

$$V_r p\text{-}p = 2I_p R + \frac{2I_p \tau}{C_c} = 2I_p(R + \tau/C_c). \quad (10)$$

In a practical case, the total circuit resistance is on the order of 0.4 ohms, the line deflection coil inductance on the order of 180 microhenrys, the deflection half-angle 38.7° and the ratio of screen curvature to deflection radius on the order of 3.5. Table 1 below compares, for several values of timing error, the relative magnitude of the ramp $\phi$(p—p) required to correct various values of time error, to the ramp (IR) needed to correct for resistance, in such an exemplary case.

| Line Rate | TIME ERROR $\tau$ | | |
|---|---|---|---|
| | 0.1μs $\phi_r$ p-p/2$I_p$r | 0.2μs $\phi_r$ p-p/2$I_p$r | 0.3μs $\phi_r$ p-p/2$I_p$r |
| 525 | 0.04 | 0.09 | 0.20 |
| 675 | 0.07 | | |
| 729 | 0.03 | | |
| 875 | 0.13 | 0.25 | 0.50 |
| 945 | 0.16 | | |
| 1023 | 0.20 | | |
| 1229 | 0.30 | 0.60 | 1.20 |

Thus, at a line rate of 1229, the linearity correction ramp in the above described exemplary practical case, must include an additional 30% to compensate for a 0.1 μs time error. It should be noted that the source of phase error between the video and the line deflection current is outside of any current feed-back loop for a line deflection amplifier. Thus, a closed loop system will provide no better linearity in a practical application, than an open loop system such as shown in FIGS. 9 and 11.

It should be appreciated in view of the foregoing description, that the present invention provides a CRT display utilizing standardized components, which in cooperation with a separate program sub-module, accommodate various sized CRTs. Further, a separate line rate module can be included, such that standardized modules can again be used in CRT displays operating at various line rates, and further such that a particular display can operate at a plurality of line rates.

It will be understood that the above description is of illustrative embodiments of the present invention, and that the invention is not limited to the specific form shown. Various modifications can be made in the design and arrangement of the elements as will be apparent to those skilled in the art, without departing from the spirit or scope of the invention as expressed in the appended claims.

What is claimed is:

1. A system of the type including a CRT having means for generating an electron beam, and means for controlling the intensity of said beam; said CRT having associated therewith deflection means for effecting scanning of said beam, said deflection means including a deflection coil; said system further including means, responsive to a video signal, for applying a signal indicative of said video signal as a control signal to said CRT beam intensity control means; means responsive to respective first and second sync signals, for generating a line deflection signal of predetermined waveform and a field deflection signal of predetermined waveform and applying said line and field deflection signals as control signals to said deflection means; said means for generating said deflection signals including a ramp generator responsive to said first sync signal; and a wave form correction circuit for converting said ramp into a signal of predetermined waveform in accordance with the relative centers of curvature of the scan of said electron beam associated with said first sync signal and the face of said CRT, said predetermined waveform signal being applied to said deflection coil to effect said scan; said means for generating said deflection signals including particular components related to said CRT, such that said respective deflection signal predetermined waveforms are in accordance with the particular structure of said CRT; the improvement wherein:

said particular components are mounted in a remote module, said remote module being removably connected with the remainder of the components of said means for generating said deflection signals; and said system includes connector means for separably providing electrical connections between said particular components and said remainder components whereby said means for generating said deflection signals can readily be adapted for use with differing CRT structures; and wherein said waveform correction circuit comprises:

a non-linear attenuator, responsive to said ramp, having a first predetermined gain with respect to signal amplitudes between first and second predetermined break point amplitudes, and a second lower gain with respect to signals above said first break point amplitude and below said break point amplitude, said first and second break point amplitudes being established by first and second resistances, resistors determinative of said first and second resistances being removably connected in said attenuator and disposed in said remote modules; and a power amplifier responsive to signals from said attenuator and a feedback signal applied thereto, for providing said predetermined waveform signal to said deflection coil, said amplifier having a feedback loop including a resistance coupled in series with said deflection coil, the voltage across said series resistance being applied as said feedback signal to said power amplifier, to provide negative feedback in accordance with the current through said deflection coil, said series resistance being removably connected in said power amplifier and disposed in said remote module.

2. The system of claim 1, wherein said first synchronization signal is a field sync signal.

3. The system of claim 1 wherein said first synchronization signal is a line sync signal.

4. A CRT display system comprising a CRT having means for generating an electron beam, and means for controlling the intensity of said beam, said CRT having associated therewith deflection means for effecting scanning of said beam, said deflection means including a deflection coil;

said system further including means, responsive to a video signal, for applying a signal indicative of said video signal as a control signal to said CRT beam intensity control means, means responsive to respective field and second sync signals, for generating a line deflection signal of predetermined waveform and a field deflection signal of predetermined waveform and applying said line and field deflection signals as control signals to said deflection means;

said means for generating said deflection signals including particular components related to said CRT, such that said respective deflection signal predetermined waveforms are in accordance with the particular structure of said CRT;

said particular components being mounted in a remote module, said remote module being removably connected with the remainder of the components of said means for generating said deflection signals;

said system including connector means for separably providing electrical connections between said particular components and said remainder components, whereby said means for generating said deflection signals can be readily adapted for use with differing CRT structures; and wherein further said means for generating said deflection signals includes a coupling capacitance connected in series with said deflection coil, and a flyback capacitance connected in parallel with the series combination of said deflection coil and coupling capacitance, a unidirectional conductive device, and a switch, both coupled across said flyback capacitance, a predetermined voltage being applied to a common node of said deflection coil coupling capacitor series combination, said flyback capacitance, said diode, and said switch being normally conductive and periodically open for a predetermined interval in accordance with said first sync signal, said flyback and coupling capacitors being of said particular components removably connected to said switch and unidirectional conductive device, and disposed in said remote module; and wherein further said means for deflecting further includes a second deflection coil and said means for generating said deflection signals includes a ramp generator responsive to said second sync signals, and a waveform correction circuit for converting said ramp into a signal of predetermined waveform in accordance with the relative centers of curvature of the scan of said electron beam associated with said second sync signal and the face of said CRT, said predetermined waveform signal being applied to said second deflection coils to effect said scan, and wherein said waveform correction circuit comprises:

a non-linear attenuator, responsive to said ramp, having a first predetermined gain with respect to signal amplitudes between first and second predetermined break point amplitudes, and a second lower gain with respect to signals above said first break point amplitude and below said second break point amplitude; said first and second break point amplitude being established by first and second resistances, resistors determinative of said first and second resistances being removably connected in said attenuator and disposed in said remote module, and an amplifier, responsive to signals from said attenuator and a feedback signal applied thereto, for providing said predetermined waveform signal to said deflection coil, said amplifier having a feedback loop including a resistance coupled in series with said deflection coil, the voltage across said series resistance being applied as said feedback signal to said amplifier, to provide negative feedback in accordance with the current through said deflection coil, said series resistance being removably connected in said amplifier and disposed in said remote module.

5. The system of claim 4, further including means for generating a linearization correction ramp, and transformer means for coupling said ramp to said deflection coil associated with said first sync signal.

6. The system of claim 5 wherein said linearization ramp is in accordance with the resistance of said deflection coil associated with said first sync signal and the phase difference between said video signal and the current through said deflection coil associated with said first sync signal.

7. In a system of the type including a CRT having means for generating an electron beam, and means for controlling the intensity of said beam, said CRT having associated therewith deflection means for effecting scanning of said beam, said system further including means, responsive to a video signal, for applying a signal indicative of said video signal as a control signal to said CRT beam intensity control means, means responsive to respective first and second sync signals, for generating a line deflection signal of predetermined waveform and a field deflection signal of predetermined waveform and applying said line and field deflection signals as control signal to said deflection means, said means for generating said deflection signals including particular components related to said CRT, such that said respective deflection signal predetermined waveforms are in accordance with the particular structure of said CRT, said system being adapted for operation in response to video signals having any one of a plurality of predetermined line rates, said line deflection predetermined waveform being different for the respective line rates, the improvement wherein:
said particular components are mounted in a remote module, said module being removably connected to the remainder of the components of said means for generating said deflection signals;
said system includes connector means for separably providing electrical connections between said particular components and said remainder components, whereby said means for generating said deflection signals can be readily adapted for use with differing CRT structures; and further
components having values solely in accordance with the line rate are mounted in a remote line rate module, component values for each of said line rates being included;
said line rate module further including means for generating a signal indicative of the instantaneous line rate;
and means for selectively connecting components having values associated with said instantaneous line rate into said line deflection signal generating means.

8. In the system of claim 7, wherein said means for deflecting includes a deflection coil and said means for generating said deflection signals includes a ramp generator responsive to said first sync signal, and a waveform correction circuit for converting said ramp into a signal of predetermined waveform in accordance with the relative centers of curvature of the scan of said electron beam associated with said first sync signal and the face of said CRT, said predetermined waveform signal being applied to said deflection coil to effect said scan, the further improvement wherein said waveform correction circuit comprises:
a non-linear attenuator, responsive to said ramp, having a first predetermined gain with respect to signal amplitudes between first and second predetermined break point amplitudes, and a second lower gain with respect to signals above said first break point amplitude and below said second break point amplitude, said first and second break point amplitudes being established by first and second resistances, resistors determinative of said first and second resistances being removably connected in said attenuator and disposed in said remote module; and
a power amplifier, responsive to signals from said attenuator and a feedback signal applied thereto, for providing said predetermined waveform signal to said deflection coil, said amplifier having a feedback loop including a resistance coupled in series with said deflection coil, the voltage across said series resistance being applied as said feedback signal to said power amplifier, to provide negative feedback in accordance with the current through said deflection coil, said series resistance being removably connected in said power amplifier and disposed in said remote module.

9. The system of claim 8 wherein said first synchronization signal is a field sync signal.

10. The system of claim 8 wherein said first synchronization signal is a line sync signal.

11. In a CRT display system of the type adapted for operation in response to video signals having any one of a plurality of predetermined line rates and including a CRT having means for generating an electron beam, and means for controlling the intensity of said beam, said CRT having associated therewith deflection means for effecting scanning of said beam, said system further including means, responsive to a video signal, for applying a signal indicative to said video signal as a control signal to said CRT beam intensity control means, means responsive to respective first and second sync signals, for generating a line deflection signal of predetermined waveform and a field deflection signal of predetermined waveform and applying said line and field deflection signals as control signals to said deflection means, said means for generating said deflection signals including particular components related to said CRT, such that said respective deflection signal predetermined waveforms are in accordance with the particular structure of said CRT, the improvement wherein:
said system includes means for adapting said means for generating said deflection signals to cooperate with a CRT having any one of a plurality of particular structures;
said means for adapting comprising:
a remote module for mounting said particular components, said module being removably connected to the remainder of the components of said means for generating said deflection signals;
connector means for separably providing electrical connections between said particular components mounted in said remote module and said remainder components;
components having values solely in accordance with the line rate being mounted in a remote line rate module, component values for each of said line rates being included;

said line rate module further including means for generating a signal indicative of the instantaneous line rate;

means for selectively connecting components having values associated with said instantaneous line rate into said line deflection signal generating means; and said means for deflecting including a deflection coil and said means for generating said deflection signal including coupling capacitance connected in series with said deflection coil, a flyback capacitance connected in parallel with the series combination of said deflection coil and coupling capacitance, a uni-directional conductive device, and a switch, both coupled across said flyback capacitance, a predetermined voltage being applied to a common node of said deflection coil coupling capacitor series combination, said flyback capacitance, said uni-directional conductive device and said switch, said switch being normally conductive and periodically opened for a predetermined interval in accordance with said first sync signal, said flyback and coupling capacitance being removably connected to said switch and uni-directional conductive device, and disposed in said remote module.

12. The system of claim 11 wherein said first sync signal is a line sync signal.

13. In the system of claim 12, wherein said means for deflecting further includes a second deflection coil and said means for generating said deflection signals includes a ramp generator responsive to said second sync signal, and a waveform correction circuit for converting said ramp into a signal of predetermined waveform in accordance with the relative centers of curvature of the scan of said electron beam associated with said second sync signal and the face of said CRT, said predetermined waveform signal being applied to said second deflection coils to effect said scan, the further improvement wherein said waveform correction circuit comprises:

a non-linear attenuator, responsive to said ramp, having a first predetermined gain with respect to signal amplitudes between first and second predetermined break point amplitudes, and a second lower gain with respect to signals above said first break point amplitude and below said second break point amplitude, said first and second break point amplitudes being established by first and second resistances, resistors determinative of said first and second resistances being removably connected in said attenuator and disposed in said remote module; and an amplifier, responsive to signals from said attenuator and a feedback signal applied thereto, for providing said predetermined waveform signal to said deflection coil, said amplifier having a feedback loop including a resistance coupled in series with said deflection coil, the voltage across said series resistance being applied as said feedback signal to said amplifier, to provide negative feedback in accordance with the current through said deflection coil, said series resistance being removably connected in said amplifier and disposed in said remote module.

14. The system of claim 13, further including means for generating a linearization correction ramp, and transformer means for coupling said ramp to said deflection coil associated with said first sync signal.

15. The system of claim 14 wherein said linearization ramp is in accordance with the resistance of said deflection coil associated with said first sync signal and the phase difference between said video signal and the current through said deflection coil associated with said first sync signal.

16. The system of claim 14 wherein said means for generating said correction ramp signal operates independently of the current through said line deflection coil.

17. The system of claim 11, further including means for generating a linearization correction ramp, signal and transformer means for coupling said linearization correction ramp signal to said deflection coil associated with said first sync signal.

18. The system of claim 17, wherein said linearization ramp signal is in accordance with the resistance of said deflection coil associated with said first sync signal and the phase difference between said video signal and the current through said deflection coil associated with said first sync signal.

19. The system of claim 11 wherein said first synchronization signal is a field sync signal.

20. A display system comprising:

a CRT having means for generating an electron beam;

means responsive to a video signal, for controlling the intensity of said beam;

scanning means for effecting scanning of said beam over the face of said CRT, said scanning means including a deflection coil, a ramp generator synchronized with a sync signal, and a waveform correction circuit for converting said ramp into a signal of predetermined waveform in accordance with the relative centers of curvature of the scan of said electron beam associated with said sync signal and the face of said CRT, said predetermined waveform signal being applied to said deflection coil to effect said scan, said waveform correction circuit comprising:

a non-linear attenuator, responsive to said ramp, having a first predetermined gain with respect to signal amplitudes between first and second predetermined break point amplitudes, and a second lower gain with respect to signals above said first break point amplitude and below said second break point amplitude, said first and second break point amplitudes being established by components of values in accordance with said relative centers of curvature; and an amplifier, responsive to signals from said attenuator and a feedback signal applied thereto, for providing said predetermined waveform signal to said deflection coil, said amplifier having a feedback loop including a resistance coupled in series with said deflection coil, the voltage across said series resistance being applied as said feedback signal to said amplifier to provide negative feedback in accordance with the current through said deflection coil;

said attenuator breakpoint components and said series resistance being removably connected in said attenuator and said amplifier respectively and disposed in a remote module associated with said CRT.

21. The system of claim 20 wherein said sync signal is a field sync signal.

22. A display system comprising:
- a CRT having means for generating an electron beam;
- means, responsive to a video signal, for controlling the intensity of said beam;
- scanning means for effecting scanning of said beam over the face of the CRT, said scanning means including:
  - a line deflection coil, a coupling capacitance connected in series with said line deflection coil, a flyback capacitance connected in parallel with the series combination of said line deflection coil and coupling capacitance, a uni-directional conductive device, and a switch, both coupled across said flyback capacitance, a predetermined voltage being applied to a common node of said line deflection coil coupling capacitor series combination, said flyback capacitance, said diode and said switch, said switch being normally conductive and periodically opened for a predetermined interval in accordance with a line sync signal; and further
  - a field deflection coil, a ramp generator responsive to a field sync signal, and a waveform correction circuit for converting said ramp into a signal of predetermined waveform in accordance with the relative centers of curvature of the scan of said electron beam associated with said vertical sync signal and the face of said CRT, said predetermined waveform signal being applied to said field deflection coil to effect said scan, said waveform correction circuit comprising:
    - a non-linear attenuator, responsive to said ramp, having a first predetermined gain with respect to signal amplitudes between first and second predetermined break point amplitudes, and a second lower gain with respect to signals above said first break point amplitude and below said second break point amplitude, said first and second break point amplitudes being established by components having values in accordance with said relative centers of curvature;
    - an amplifier, responsive to signals from said attenuator and a feedback signal applied thereto, for providing said predetermined waveform signal to said field deflection coil, said amplifier having a feedback loop including a resistance coupled in series with said field deflection coil, the voltage across said series resistance being applied as said feedback signal to said amplifier, to provide negative feedback in accordance with the current through said deflection coil,
- said flyback and coupling capacitance, said attenuator breakpoint components and said series resistance being removably connected in said system and all disposed in a remote module associated with said CRT.

23. A display system comprising
- a CRT having means for generating an electron beam;
- means, responsive to a video signal, for controlling the intensity of said beam;
- scanning means for effecting scanning of said beam over the face of the CRT, said scanning means including:
  - a line deflection coil, a coupling capacitance connected in series with said deflection coil, a flyback capacitance connected in parallel with the series combination of said deflection coil and coupling capacitance, a uni-directional conductive device and a switch, both coupled across said flyback capacitance, a predetermined voltage being applied to a common node of said deflection coil coupling capacitor series combination, said flyback capacitance, said diode, and said switch, said switch being normally conductive and periodically opened for a predetermined interval in accordance with a sync signal;
- said flyback and coupling capacitance being removably connected to said switch and uni-directional conductive device, and disposed in a remote module associated with said CRT;
- said system further including means for generating a linearization correction ramp, and transformer means for coupling said ramp to said deflection coil associated with said line sync signal, wherein said correction ramp peak-to-peak amplitude is substantially equal to $2I_p(R+\tau/C_c)$ where $I_p$ is the peak current through said deflection coil during the line scan interval, R is the resistance of said deflection coil, $C_c$ is the value of said coupling capacitance, and $\tau$ is the timing error due to phase differences between said video signal and said current through said deflection coil.

* * * * *